Patented Dec. 7, 1943

2,335,947

UNITED STATES PATENT OFFICE 2,335,947

TANNING AGENTS AND PROCESS OF PREPARING THEM

Ernst Koch, Frankfort-on-the-Main, Germany; vested in the Alien Property Custodian No Drawing. Application November 14, 1940, Serial No. 365,649. In Germany March 18, 1939

9 Claims. (Cl. 260—98)

It is known that tanning agents may be prepared by causing natural resins and aromatic hydroxy compounds to react with sulfuric acid. Either a molten mixture of the two constituents is sulfonated or a condensation product is first prepared by heating the molten mixture in the presence of dilute acid and the said product is then sulfonated.

After removal of the sulfuric acid in excess and also after mixing with synthetic tanning agents, all tanning agents obtained as above described are very sensitive to salts and are not compatible in all proportions with sulfite cellulose waste liquor or with vegetable tanning agents. In view of these properties it is in many cases impossible to use tanning agents prepared from resin and aromatic hydroxy compounds simultaneously with other tanning agents of either natural or synthetic origin.

The above mentioned two processes not only yield tanning agents with unsatisfactory properties but the processes proper have technical drawbacks. In both cases it is necessary to first melt the resin. Since the resin, however, is a poor conductor of heat and, moreover, cannot be stirred during the melting process, it is necessary to apply a considerable amount of heat for a considerable time. The subsequent sulfonation being a very exothermic reaction, the melt must be cooled to a very low degree prior to the addition of the sulfonating agent. This again involves loss of time so that the operation up to the beginning of the sulfonation requires about 50% more time than does the sulfonation process itself.

Now, I have found that tanning agents are obtained which are similar to the known products but have a much better stability to salts and a better compatibility with sulfite cellulose waste liquor and vegetable extracts, by first sulfonating the aromatic hydroxy compounds, causing the sulfonic acid to react with the resin and then sulfonating the reaction product obtained.

Furthermore, I have found that, according to the process of the present invention, it is not only possible to separately prepare the hydroxyarylsulfonic acid and to cause this acid to react at any time with the resin, i. e., to proceed in two separate operations wholly independent of each other but that it is advantageous to cause the resin to react with the still warm sulfonation mass of the hydroxy compound.

The reaction may be carried out as follows: The quantity of acid necessary for the sulfonation or advantageously a little less than required for complete sulfonation is caused to run into the aromatic compound. The temperature of the sulfonation mass rises, for instance when cresol is used, to 70° C.–90° C. Thereupon, the resin is introduced in portions into the sulfonic acid, while stirring, the proportion being about 1–3 parts by weight of resin for 1 part by weight of aromatic hydroxy compound. The most favorable ratio is 2 parts by weight of resin for 1 part by weight of the hydroxy compound. By introducing the resin into the sulfonic acid, reaction of the components takes place with elimination of heat. Consequently, the resin melts at once so that it may be introduced rather quickly. Thus the heat of reaction serves to melt the resin. The whole is then cooled but it is not necessary to cool to such low temperatures as with the known processes. The quantity of acid necessary for the second sulfonation is then caused to run in. In this way less time is required and less cooling liquid need be applied. Also during the sulfonation no cooling or hardly any cooling is required.

The sulfonation processes take place in known manner. Advantageously there is used a small excess of the weight, used for both sulfonations, of sulfonating agent such as fuming sulfuric acid, sulfuric acid monohydrate, chlorosulfonic acid or the like calculated on the total amount of resin and aromatic hydroxy-compound. The excess amounts to about 20% of the weight of the resin-phenol mixture. Also a larger excess is not detrimental. The washing out of the sulfuric acid in excess after the precipitation of the tanning agent and, if desired, the mixing of the product washed out with a synthetic tanning matter also take place according to known methods.

Generally, any supply of heat is superfluous during the whole reaction process. The time necessary for the sulfonation is reduced to less than half the time hitherto required and the quantity of the cooling water amounts only to a fraction of that used according to the known processes.

It is also possible to start from ready-made sulfonated aromatic compounds. In this case the sulfonic acid must be heated to the melting temperature of the respective resin, that is to say, practically to 50° C.–90° C. The resin is then introduced as above described and the second sulfonation follows.

As natural resins there may be used balsamic resins and resins obtained by extraction as well as constituents of these resins such as abietic acid, furthermore, tall oil. Suitable aromatic hydroxy compounds are phenol, cresols, xylenols, resorcinol, naphthol, dihydroxydiphenylsulfone, dihydroxydiphenylmethane and mixtures of these substances such as crude cresol, phenol oil and creosote oil.

The following example illustrates the invention, the parts being by weight:

30 parts of sulfuric acid monohydrate are caused to run, while stirring, into 45 parts of cresol. The temperature of the sulfonation mass rises to 80° C. and after a short time the mass is soluble in water. 135 parts of colophony are introduced in portions, the whole reaction mixture rising to a temperature of 100° C.–110° C. After stirring for a short time, the mixture is cooled to about 75° C. and 160 parts of sulfuric acid monohydrate are run in. When the sulfonation is finished, the main quantity of the acid in excess is removed by washing out after precipitation of the tanning matter. The tanning matter is then rendered neutral by addition of 25 parts of aqueous ammonia of 25% strength and acidified by means of a solution of 20 parts of oxalic acid in 140 parts of water. 250 parts of a synthetic tanning matter, prepared according to U. S. Patent 1,912,260 by the reaction of a still liquid phenol-formaldehyde condensation product with benzyl-naphthalene-sulfonic acid, are then added

I claim:

1. A process of preparing tanning agents comprising the sulfonation of the reaction product of natural resins and aromatic sulfonic acids containing phenolic hydroxy groups.

2. In the process of preparing tanning agents the steps comprising the sulfonation of aromatic compounds containing phenolic hydroxy groups, causing the thus formed warm sulfonic acid to react with natural resins and then sulfonating the reaction product.

3. In the process of preparing tanning agents the steps comprising the sulfonation of cresol, causing the thus formed warm sulfonic acid to react with natural resins and then sulfonating the reaction product.

4. In the process of preparing tanning agents the steps comprising the sulfonation of cresol, causing the thus formed sulfonic acid to react with natural resins at their melting temperature and then sulfonating the reaction product.

5. In the process of preparing tanning agents the steps comprising the sulfonation of cresol with sulfuric acid monohydrate, causing the thus formed sulfonic acid to react with colophony and then sulfonating the reaction product with sulfuric acid monohydrate.

6. The process of preparing tanning agents which comprises sulfonating a phenol, reacting the thus-formed warm sulfonic acid with a natural resin by adding the resin in portions to the sulfonic acid while utilizing the heat of the reaction between the sulfonic acid and the resin to effect a melting of the resin, and sulfonating the reaction product.

7. The process as defined in claim 6 wherein the reaction mixture is cooled prior ot the final sulfonation.

8. The process as defined in claim 6 wherein the phenol is cresol and the natural resin is colophony.

9. The process as defined in claim 6 wherein the phenol is sulfonated at a temperature of 80° C., the heat of the reaction is 100 to 110° C. and the reaction product is sulfonated at a temperature of 75° C.

ERNST KOCH